Dec. 19, 1967   R. L. KOSROW ET AL   3,358,628
SEWING MACHINE CONTROL

Filed July 26, 1965   5 Sheets-Sheet 1

FIG.1.

Dec. 19, 1967 R. L. KOSROW ET AL 3,358,628
SEWING MACHINE CONTROL

Filed July 26, 1965 5 Sheets-Sheet 2

United States Patent Office

3,358,628
Patented Dec. 19, 1967

3,358,628
SEWING MACHINE CONTROL
Robert L. Kosrow, Elk Grove Village, and Arthur N. Hale, Park Ridge, Ill., assignors to Union Special Machine Company, Chicago, Ill., a corporation of Illinois
Filed July 26, 1965, Ser. No. 474,712
19 Claims. (Cl. 112—219)

ABSTRACT OF THE DISCLOSURE

An electrically driven sewing machine in which the needle is driven at high speed by a main driving motor which also drives an auxiliary motor at a higher speed than the normal drive speed of the auxiliary motor and in which the auxiliary motor is energized, when the main drive motor is de-clutched, to slow down the drive speed of the needle and, thereafter, drive the needle at a slower speed and the needle is stopped, at a predetermined fixed position, by reversing the energization of the auxiliary motor.

---

This invention relates to sewing machine controls and, more particularly, to the automatic halting of the needle of a sewing machine in any desired preselected position and to the controlling of the speeds of the machine.

Sewing machines, especially machines for commercial sewing, are driven at a relatively high rate of speed. Such machines are usually driven by an electric motor which is continuously powered during the operation of the machine. By a system of pulleys and belts the motor drives the cooperating stitch forming parts of the sewing machine of which one part is the needle. A clutch and brake system is positioned between the motor and the needle bar in the usual assembly. The clutch and brake are controlled by a foot treadle which, when pressed to run the machine, engages the clutch with the motor drive to drive the needle bar. When the treadle is released, or heeled, the clutch is disengaged from the motor and is engaged by the brake to stop the machine.

In many such machines, the movable clutch member is utilized for both clutching to drive the machine and braking to stop the machine. The movable clutch member may be a disc having, at its opposite faces, friction surfaces. One of the friction surfaces engages the driven member of the motor when the clutch is engaged to drive the machine and the other friction surface engages a stationary member to stop the machine after the clutch is released.

In the usual sewing machine, when the clutch is engaged, the needle is driven at a constant speed. The needle may be raised and lowered fifty-five hundred or more times per minute. Where, for purposes of ending a seam, turning a corner, or the like, the operator wishes to operate the needle at a slower speed, the operator might partially disengage, or slip, the clutch or partially engage, or slip, the brake. This the operator accomplishes by partially releasing, or heeling, the treadle. To a very great extent, the ability of the operator to decrease the machine speed is governed by the operator's familiarity with the machine, the response of the particular machine to treadle movement and the judgment of the operator in visually observing needle motion. In addition, of course, partial engagement of, or slipping, the clutch or brake results in wear on the clutch and braking surfaces.

In addition to needle speed, in the usual sewing machine the position of the needle at the time the machine stops is solely a matter of chance. When the machine is stopped, the needle may be in the up position, that is, fully withdrawn from the base plate, in the down position in the base plate, or at any intermediate position of advance toward, or withdrawl from, the base plate. Depending on the stitching operation which is to follow, the machine operator might want the needle positioned in the material, that is, in its down position, or withdrawn from the material, that is, in its up position. For example, when the operator finishes a seam in one direction and wishes to continue the seam in another direction, before turning the material it might be desired to have the needle down and in the material. This needle position would permit the operator to turn the material about the needle and continue the seam in the new direction without gaps between the seams or loose thread. Conversely, where the operator has finished the sewing operation on a particular piece of material and wishes to remove the material from the machine when the needle stops, the withdrawn position of the needle may be desired. In most instances, the desired needle position is attained by the operator turning the machine by hand after the machine has stopped.

Many attempts have heretofore been made to control the speed of sewing machines and to regulate the position at which the needle is stopped. Such attempts have been accomplished by adding various attachments and auxiliary drives to the machine. These, however, have required substantial alterations to the machine, operating practices unfamiliar to the normal machine operator and time-consuming losses in machine operations.

One of the objects of the instant invention is to provide an improved system for controlling the speed of a sewing machine.

A further object is to provide an improved system in which the position at which the needle will stop can be controlled.

Still a further object is to provide such a system which is readily adaptable to existing machines.

A still further object is to provide such a system without loss of time of normal machine operation.

These and other objects will be apparent from the following description and attached drawings in which.

Figure 1:
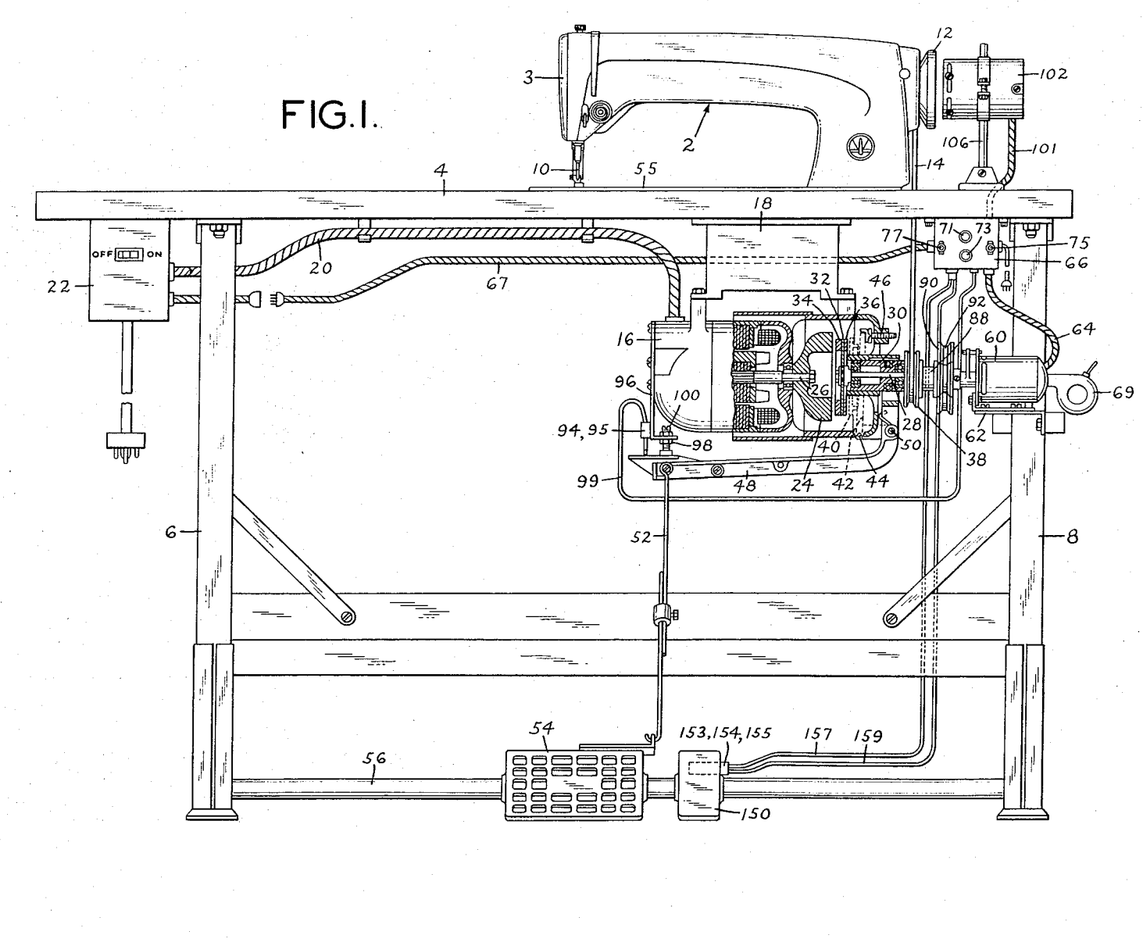
FIG. 1 is a front elevational view, partly in section, of an embodiment of the instant invention.

Referring now to FIG. 1 in which an embodiment of the instant invention is shown, sewing machine 2 is supported on table 4 having legs 6, 8. Needle 10 is mounted for vertical reciprocation in sewing head 3 of sewing machine 2 by conventional mechanism, not shown. Handwheel 12, at the right-hand end of sewing machine 2 a shown in FIG. 1, is attached to the rotary shaft of the machine, handwheel 12, the rotary shaft, the needle drive mechanism, and needle 10 being driven by a belt 14.

Main driving motor 16 is mounted on support 18 fixedly connected to the bottom of table 4. Electric power to motor 16 is furnished through conduit 20 and switch 22 from a source of power, not shown. Flywheel 24 is connected to motor shaft 26 of main drive motor 16.

Driven shaft 28 is mounted in axial alignment with motor shaft 26 on bearing 30 for axial movement toward and away from motor shaft 26 and flywheel 24. At the end of shaft 28 adjacent flywheel 24, clutch member 32 having at its opposite faces friction clutch surface 34 and friction brake surface 36, is fixedly connected to the end of driven shaft 28. Pulley 38 is connected to the opposite end of driven shaft 28. Belt 14 is belted over pulley 38, as well as the pulley, not shown, in sewing machine 2.

For reasons more apparent hereinafter, the conventional brake is not employed in the apparatus of the instant invention but is shown, in phantom, in FIG. 1. The conventional brake includes a stationary member 40 mounted for adjustment, toward and away from the brake surface 36 of clutch 32, on arm 42 pivotally connected at 44 to the housing of main driving motor 16. The position of member 40 is adjusted by threaded adjustment 46 threadably carried in the housing of the motor. By turning the thread adjustment 46, stationary member 40 is moved toward and away from brake surface 36. When adapted to the instant invention, stationary member 40 is adjusted to its maximum position away from brake surface 36 so that, when the clutch is disengaged, the braking surface does not contact the stationary member 40.

Control arm 48 is pivotally connected, by pin 50, to the housing of main driving motor 16 and, at its upper end, is connected to bearing 30. At its opposite end, control arm 48 is connected, by adjustable rod 52, to main treadle 54 rotatably supported on shaft 56 supported, at its opposite ends, on legs 6, 8.

The foregoing mechanism is a conventional sewing machine drive. When the sewing machine is in operation, switch 22 is on and main driving motor 16 is energized and driving. When treadle 54 is pressed, control arm 48 is pivoted counterclockwise around pin 50 and engages friction clutch surface 34 with flywheel 24. Thus, driven shaft 28 is rotated at the speed of the main driving motor and pulley 38, through belt 14 and the driving mechanism, not shown, in sewing machine 2, reciprocates needle 10 vertically. In its downward travel, needle 10 enters the sewing mechanism positioned below bedplate 55, is withdrawn, and with the mechanism, forms the desired stitch. When treadle 54 is released, or heeled, control arm 48 moves clockwise about pin 50, disengages clutch surface 34 from flywheel 24, and engages brake surface 36 with stationary member 40 to stop the machine.

Thus, with the clutch fully engaged, needle 10 is driven, through the clutch, pulleys, belt and drive mechanism at constant speed. When the treadle is released, or heeled, the brake is engaged and the needle is stopped. The needle may stop in any position. Once the machine is stopped, the operator can, of course, adjust the needle to the desired position by manually turning handwheel 12. In manually positioning the needle, the operator must press lightly on treadle 54 to disengage brake surface 36 of clutch 32 from stationary brake 40, thereby losing time and, at the same time, must manually overcome the mechanical resistance of the machine.

Referring to FIGS. 1 to 8, the adaption of the above described machine to the instant invention will now be described.

Auxiliary motor 60 is mounted on support 62 fixed to leg 8. Auxiliary motor 60 is connected through cable 64, control box 66, cable 67, and switch 22, to the power source. Control box 66, having potentiometers 71, 73 and toggle switches 75, 77, is mounted on the bottom of table 4. Blower 69 is mounted on auxiliary motor 60 to cool the motor. The blower may run continuously or may be thermostatically controlled by the motor to run only when the motor is hot.

Figure 2:
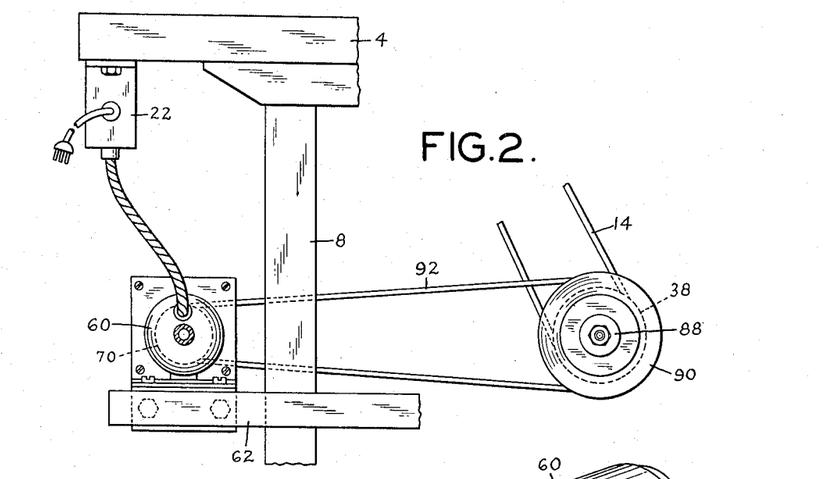
FIG. 2 is a partial end view in elevation taken from the right of FIG. 1.
Figures 4, 5:
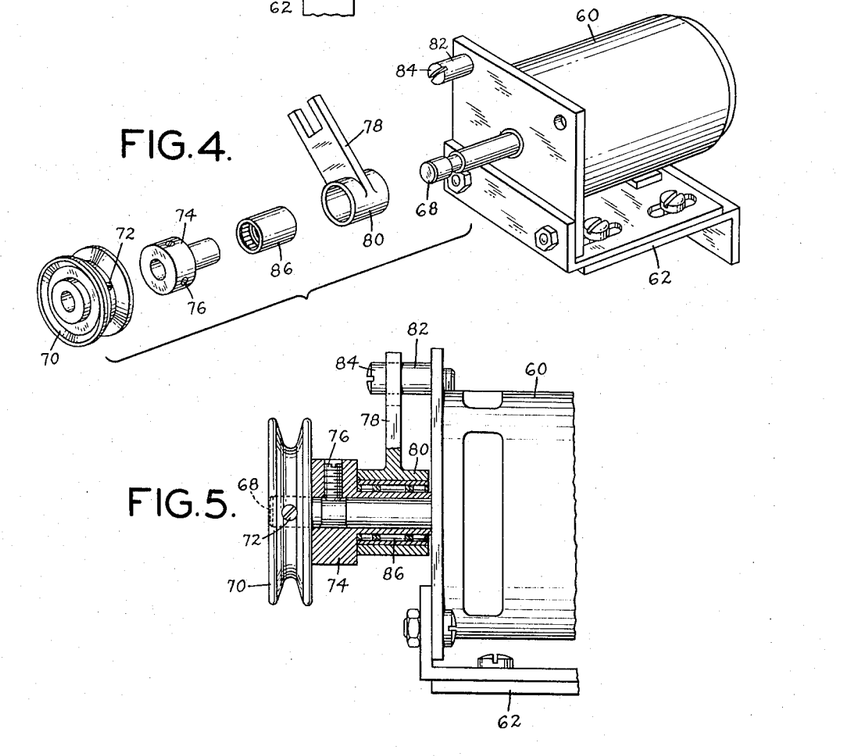
FIG. 4 is an enlarged perspective view, partially exploded, of the auxiliary motor drive assembly of FIG. 1.
FIG. 5 is an enlarged partial side elevational view, partly in section, of the assembled drive of FIG. 4.
Figure 6:
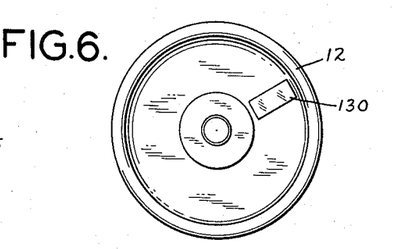
FIG. 6 is an enlarged end view of the handwheel of FIG. 1.

Referring now to FIGS. 2, 4 and 5, drive shaft 68 of auxiliary motor 60 is connected to pulley 70 by set screw 72. Intermediate auxiliary motor 60 and pulley 70, collar 74 is connected for rotation with shaft 68 by set screw 76. Arm 78, having a hub 80, is connected by screw 84, having enlarged shank 82, to the housing of motor 60. Motor shaft 68 of auxiliary motor 60 passes through the hub of arm 78. A one-way roller clutch 86 is positioned in hub 80 intermediate collar 74 and the inner diameter of hub 80.

In the illustrated embodiment, driven shaft 28 (FIG. 1) has an extension 88. Pulley 90 is keyed to the end of shaft 88. Thus, when clutch 32 is engaged, driven shaft 28, extension 88, and pulley 90 are driven. Belt 92 is belted over pulley 90 and pulley 70.

Double pole, double throw switch 94, 95 (FIG. 1) is carried on bracket 96 fixed to the housing of main driving motor 16, the end of bracket 96 having a stop 98 adjustably mounted in the end of bracket 96 by adjusting screw 100. Switch 94, 95 is connected to control box 22 by cable 99.

Figure 7:
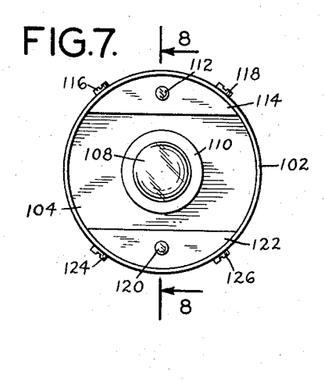
FIG. 7 is an enlarged end view, looking from the flywheel end of the machine of FIG. 1, into the needle positioning control of FIG. 1.
Figure 8:
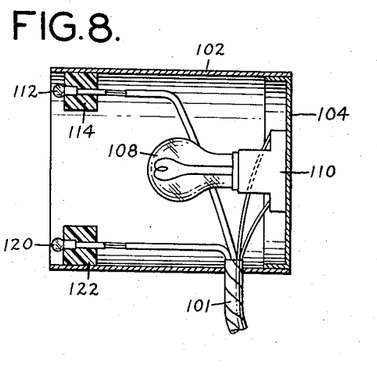
FIG. 8 is an enlarged side elevational view, in section, of the needle position control of FIG. 1.

Referring now to FIGS. 1, 7 and 8, container 102, closed at one end by wall 104 and open at its other end, is mounted on table 4 by support 106. Lamp 108 is mounted in receptacle 110 fixed to wall 104. A photoconductive switch 112 of light sensitive material, such as light sensitive silicon, which acts as a high resistance, open switch until exposed to a light of predetermined intensity, is mounted in support 114 adjustably mounted by screws 116, 118 in container 102. A second such photoconductive switch 120 is mounted in support 122 adjustably mounted by screws 124, 126 in container 102. Lamp 108 and photoconductive switches 112, 120 are connected to control box 66 by cable 101. Potentiometers 71, 73, located in control box 66, are connected in parallel with photoconductive switches 112, 120, respectively, to regulate the sensitivity of each switch to light. Turning the potentiometer in one direction, the photoconductive switch becomes more sensitive and, in the opposite direction, less sensitive.

The open end of container 102 faces the end of handwheel 12. The face of handwheel 12 (FIG. 6), facing the open end of container 102, has a strip of reflective material 130 fixed to the surface of the handwheel so that light striking the handwheel through the open end of container 102 from bulb 108 strikes reflective material 130 and is reflected back toward the open end of the container.

Figure 3:
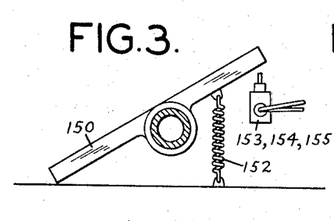
FIG. 3 is a side view of the auxiliary treadle control.

Referring now to FIGS. 1 and 3, inching treadle 150 is pivoted on shaft 56 and is spring pressed toward its released, or heeled, position by spring 152. For purposes more apparent hereinafter, triple pole, double throw switch 153, 154, 155 is positioned below the toe end of treadle 150 so that when the treadle is toed, or pressed, the switch is engaged and when the treadle is released, or heeled, the switch is disengaged. Switch 153, 154, 155 is connected to control box 66 by conduits 157, 159.

Both main driving motor 16 and auxiliary motor 60 are 220 volt, 60 cycle, 3 phase motors. Main driving motor 16 is a high torque, high inertia motor of the type conventionally employed on sewing machines. Auxiliary motor 60 is a high torque, low inertia induction motor, such as the type employed for rotating radar antennas, the windings of such motors being relatively heavy so that the motor may be operated for short intervals at extremely high torque. Auxiliary motor 60 must be of the reversible type in which reverse polarity may be applied to the windings of the motor in order to bring the motor to an instant stop and then instantly reverse its rotation.

As will be apparent later, auxiliary motor 60 is an important unit to the instant invention. For reasons which will be obvious, the rotor of the auxiliary motor should be light in weight and of low inertia so that it will accelerate and decelerate quickly. Motors with heavy windings to withstand high current loads are preferred. Standard motors, however, have been found to work very well. The motor may be AC or DC powered provided, of course, a suitable power source is available. A synchronous motor may be employed but is not required.

In the operation of the instant machine, switches 22 and 77 are placed in the "on" position connecting main driving motor 16 and control box 66 to a source of electrical current, not shown. Main driving motor 16 is in operation and flywheel 24 is rotating at the driving speed of main driving motor 16. Lamp 108 in container 102 is lit. The electrical circuit to auxiliary motor 60 is open. Hence, there is no power to auxiliary motor 60 and the auxiliary motor is at rest. Main treadle 54 and inching treadle 150 are in their released, or heeled, positions and clutch 32, pulley 38, needle 10, handwheel 12, are at rest.

To start the machine, main treadle 54 is pressed, and clutch 32 is engaged with flywheel 24. Pressing main treadle 54 also activates double pole, double throw switch 94, 95 to activate the controls, later described, in control box 66. The electrical circuit to auxiliary motor 60 remains open.

With clutch 32 engaged, pulleys 38, 70, 90, belts 14, 92, handwheel 12, needle 10 and auxiliary motor 60 are all driven by main drive motor 16. Main driving motor 16 turns flywheel 24 at an approximate speed of 3450 r.p.m. By the arrangement of belts and pulley, needle 10 is driven at a speed of 5500 r.p.m. and auxiliary motor 60 is driven, by main drive motor 16, at a speed of 8000 r.p.m.

To stop the machine, main treadle 54 is released, or heeled, and clutch 32 is disengaged from flywheel 24. Releasing main treadle 54 simultaneously reactivates double pole, double throw switch 94, 95. When main treadle 54 is released, control arm 48 engages stop 98 and prevents brake surface 36 of clutch 32 from engaging stationary member 40.

Through controls to be described later, reactivation of switch 94, 95 activates auxiliary motor 60 connecting motor 60 to the source of electrical current. Thus, motor 60 is activated.

At the time main treadle 54 is released, auxiliary motor 60 is being driven by main driving motor 16 at 8000 r.p.m. The approximate speed of auxiliary motor 60 is 1725 r.p.m. Hence, when connected to the source of electrical current and activated, auxiliary motor 60 immediately applies a strong braking torque to the drive, reducing the speed of the drive at auxiliary motor 60 to the driving speed of 1725 r.p.m. of auxiliary motor 60. Because of the pulley and belting arrangement, the speed of needle 10 is reduced to 1200 r.p.m.

Before releasing main treadle 54, and depending upon the position in which needle 10 is to stop, the operator places toggle switch 75 up or down. Thus, either photoconductive switch 112 or 120 is activated and, as will be more fully described later, the needle is selectively stopped in its "up" or "down" position.

As will be more apparent from the later description of the controls, in addition to activating auxiliary motor 60 to reduce the speed of the machine to the driving speed of auxiliary motor 60, reactivation of double pole, double throw switch 94, 95 also energizes a time delay circuit in control box 22. This time delay circuit is preset to remain open while auxiliary drive motor 60 brakes the drive to the driving speed of motor 60 and to remain open for a short interval of time after the speed of the machine is reduced to the driving speed of auxiliary motor 60. Preferably, the interval of time during which the machine is driven by auxiliary motor 60 at its driving speed is held to the minimum.

Once the preset time interval has passed, the time delay circuit trips and, depending upon the direction in which toggle switch 75 has been placed, photoconductive switch 112 or 120 is actuated by the reflection of light 108 from reflective strip 130. Actuation of the selected photoconductive switch reverses the polarity in auxiliary motor 60. The reverse in polarity applies a high reverse torque to auxiliary motor 60 and, in approximately one revolution depending upon the moment of inertia, brings the machine to a stop. Auxiliary motor 60 is prevented from turning in the reverse direction by a one-way clutch 86 which, when auxiliary motor 60 attempts to turn drive shaft 68 in the reverse direction, locks with arm 78 to lock shaft 68. Auxiliary motor 60 is stalled and the power to auxiliary motor 60 is shut off. The time delay circuit then opens.

In addition to braking and stopping the needle in a preselected position, auxiliary drive motor 60 may be employed by the operator to drive the needle at the slower speed of auxiliary drive motor 60 or, for the purpose of inching, to operate the machine one stitch at a time. For these purposes inching treadle 150 is mounted next to main treadle 54 and is pressed by the operator after main treadle 54 is released. When inching treadle 150 is pressed, treadle 150 actuates triple pole, double throw switch 153, 154, 155. The operation of the machine by auxiliary motor 60 under control of inching treadle 150 and switch 153, 154, 155 will be further described in connection with the description of the controls which follows.

Figure 9:
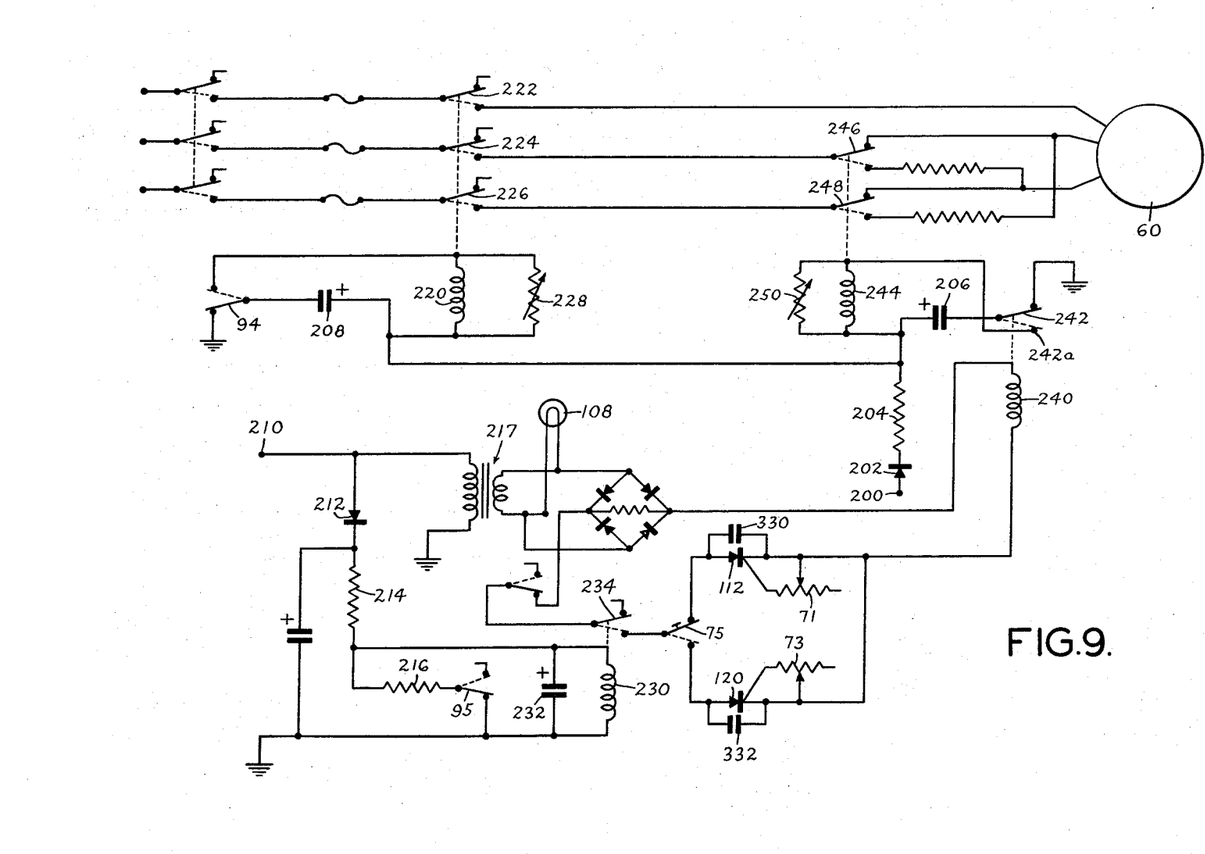
FIG. 9 is a schematic diagram of the control circuit of the instant invention.

Referring now to FIG. 9 showing the control system for stopping the machine with the needle in either the preselected "up" or "down" position, when the machine is started in its normal sewing operation, main treadle 54 is pressed, clutch 32 is engaged with flywheel 24 and switch 94, 95 is actuated. When thus actuated, switch 94 (FIG. 9) is grounded and switch 95 is closed.

With switch 94 grounded, 110 volt, 60 cycle current flows from source 200 through rectifier 202 and is rectified to direct current. This current flows through resistor 204, charges capacitors 206, 208 and then flows to ground. When capacitors 206 and 208 are fully charged, the current stops flowing.

At the same time switch 94 is grounded, switch 95 is closed. With switch 95 closed, current from 110 volt, 60 cycle source 210 flows through rectifier 212, resistors 214, 216, through closed switch 95 to ground. Source 210 supplies current to transformer 217 from which 6.3 voltage is supplied to lamp 108. Lamp 108 is lighted continuously irrespective of the positions of switches 94, 95.

To stop the machine, the operator releases, or heels, treadle 54. Clutch 32 is disengaged from main drive motor 16. Motor 16 continues to run. Clutch 32 is positioned in a neutral position, that is, clutch 32 is out of engagement with flywheel 24 and clutch 32 and stationary member 40 are adjusted so that braking surface 36 of clutch 32 and stationary member 40 do not engage. Simultaneously with the disengagement of the clutch switches 94, 95 are reactivated.

Reactivation of switch 94 moves the switch to the position shown in phantom line in FIG. 9. With switch 94 in the phantom position, capacitor 208 is discharged through relay coil 220, activating the relay and closing contacts 222, 224, 226 in the 220 volt, 3 phase, 60 cycle supply to auxiliary drive motor 60. Thus, auxiliary motor 60 commences its drive. Because, as noted above, auxiliary motor 60 was being driven at 8000 r.p.m. at the time contacts 222, 224, 226 close, the supply of current to auxiliary motor 60 causes the motor to brake to its driving speed of 1725 r.p.m., thus slowing down or braking the running speed of the sewing machine proportionately to the driving speed of motor 60. As soon as capacitor 208 is discharged, relay 220 is deactivated and contacts 222, 224, 226 open. Auxiliary motor 60 is then disconnected from the power supply. Adjustable potentiometer 228 is connected in parallel with relay 220 in order that the time interval required to discharge capacitor 208 and reopen relay 220 may be adjusted.

Reactivation of switch 95, which occurs simultaneously with the operation of switch 94, opens switch 95 and starts delay action to relay 230. With switch 95 open, current from rectifier 212 flows through resistor 214 and charges condenser 232. The charging of condenser 232 allows time for auxiliary drive motor 60 to reduce its speed from its 8000 r.p.m. driven speed to its 1725 r.p.m. driving speed. After condenser 232 is charged, current flow to the coil of single pole, double throw relay 230, actuates relay 230 and closes contact 234.

Before releasing treadle 54 to stop the machine, the operator has determined whether the needle is to be stopped in its "up" or "down" position and, in keeping with such determination, has positioned toggle switch 75 in the selected position. Assuming the needle is to be stopped in its "up" position and the operator has placed toggle switch 75 in its "up" position, closing contacts 234 allows current to flow to photoconductive switch 112. Potentiometer 71 has also been adjusted by the operator so that switch 112 is non-conductive except when exposed to reflected light from bulb 108 reflected by reflector strip 130. Thus, at the time contacts 234 are closed, switch 112 is nonconductive and open. The adjustments of potentiometers 71 and 73 readily adjust the sensitivity of photoconductive switches 112, 120. If desired, the surface of pulley 12 facing the open end of container 102 may be painted with a light absorbing paint so that reflector strip 130 is the only reflecting surface on the pulley face. However, the use of such paint is not necessary.

Photoconductive switch 112 is, of course, stationary and handwheel 12 and reflector strip 130 are rotating. With current flowing to switch 112, when reflector strip 130 passes the switch 112, the light from light bulb 108 is reflected by reflector strip 130 to switch 112, lowers the resistance of the photoconductive switches, causes the switch to act as a closed switch and permits the current to flow through the switch and through relay 240, energizing relay 240 and moving contact 242 of relay 240 to the position shown in phantom in FIG. 9. Capacitor 206, which was previously charged, is then discharged through double pole, double throw relay 244, actuating contacts 246, 248 of relay 244 and reversing the polarity of auxiliary drive motor 60. Reversing the polarity of motor 60 which is, at the time, driving at 1725 r.p.m., applies a reversing torque to motor 60 which, approximately in one revolution of the handwheel, stops motor 60 and the machine with the needle in the "up" position as more fully described below.

It is, of course, understood that with the toggle switch 75 pushed downward rather than upward photoconductive switch 120, rather than 112, would stop the machine, in a similar manner, but with the needle in its "down" position.

As soon as capacitor 206 is discharged, relay 244 is deactivated and contacts 246, 248 open. Adjustable potentiometer 250 is connected in parallel with relay 244 in order that the time interval required to discharge capacitor 206 and reopen relay 244 may be adjusted.

From the foregoing description it is apparent that final stopping of the machine, and the stop position of the needle, depend on the actuation of the photoconductive switch by the reflective strip on the handwheel. Thus, the reflective strip and the switches are positioned so that light will be reflected to photoconductive switches ahead of the point at which the handwheel and needle are to stop. The relative position of the photoconductive switches to the reflective strip is accomplished by adjusting container 102 in support 106 and adjusting each of the photoconductive switches 112, 120 in the container. Through these adjustments, the final stopped position of the needle can be controlled with a high degree of accuracy.

In the above operation, only main treadle 54 is employed. The operator presses main treadle 54 to operate the machine. When the machine is to be stopped, the operator releases, or heels, treadle 54, and, through the controls described above, the speed of the machine is reduced to the driving speed of auxiliary drive motor 60 and the machine is then stopped with the needle "up" or "down," as the case may be. This is all accomplished, in the instant invention, without action by the operator other than in releasing, or heeling, the treadle and presetting toggle switch 75 in its "up" or "down" positions.

Figure 12:
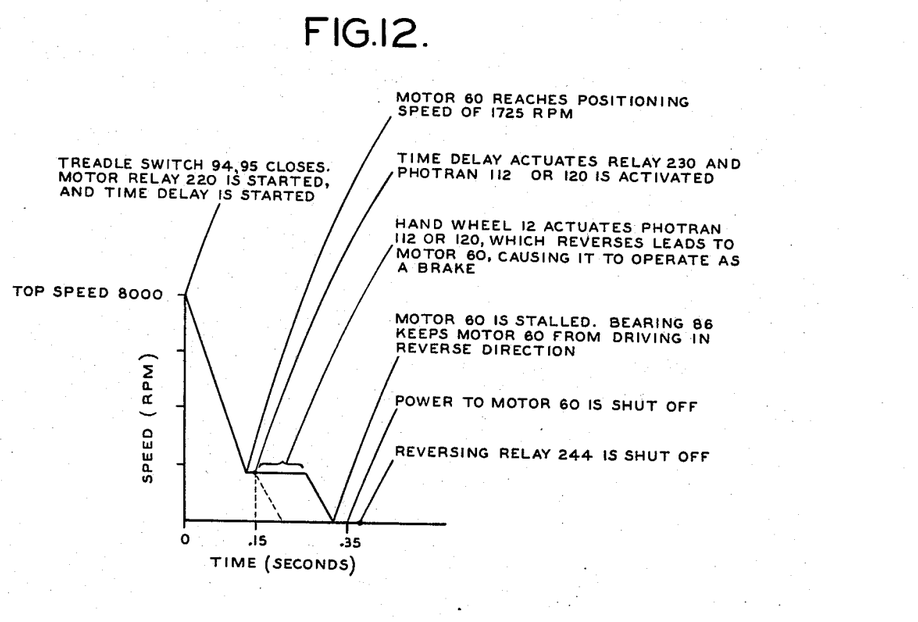
FIG. 12 is a graphical representation in which speed is plotted against time to graphically show the time required in the various steps in the operations of the instant invention in bringing the machine to stop from full speed.

The controls of the instant invention bring the machine to stop after treadle 54 is released, or heeled, in a relatively short interval of time. For example, as shown in FIG. 12, with treadle 54 pressed and main driving motor 16 operating the machine, and driving auxiliary drive motor at 8000 r.p.m., treadle 54 is released, or heeled, switches 94, 95 are closed and relay 220 is activated. In less than .15 second the speed of auxiliary drive motor 60 is reduced to 1725 r.p.m. and within a short period of time (.15 second after initial release of treadle 54), relay 230 is activated and current flows to the photoconductive switch. When reflector strip 130 passes the switch, the flow of current through the switch commences, reversing relay 244 is actuated, the fields, or leads to the fields, of auxiliary motor 60 are reversed and the motor is stopped. All of this occurs less than .35 second after initial release, or heeling, of treadle 54. When the motor is stopped, the needle is stopped in its preselected "up" or "down" position. The motor is stalled. The power to auxiliary motor 60 is shut off and, shortly thereafter, reversing relay 244 is shut off. All of this occurs only .35 second after initial release of treadle 54.

In addition to stopping the machine with the needle in the preselected "up" or "down" position, auxiliary motor 60 may be operated to run the machine at reduced speed or, where desired, for single stitching. These operations will now be described with reference to FIG. 10. As can be readily seen, the control system of FIG. 10 includes the components of FIG. 9, described above, with additional components added to the circuitry to accomplish the desired reduced speed and single stitch operations. The additional components, and their operation, will now be described.

Figures 10, 11:
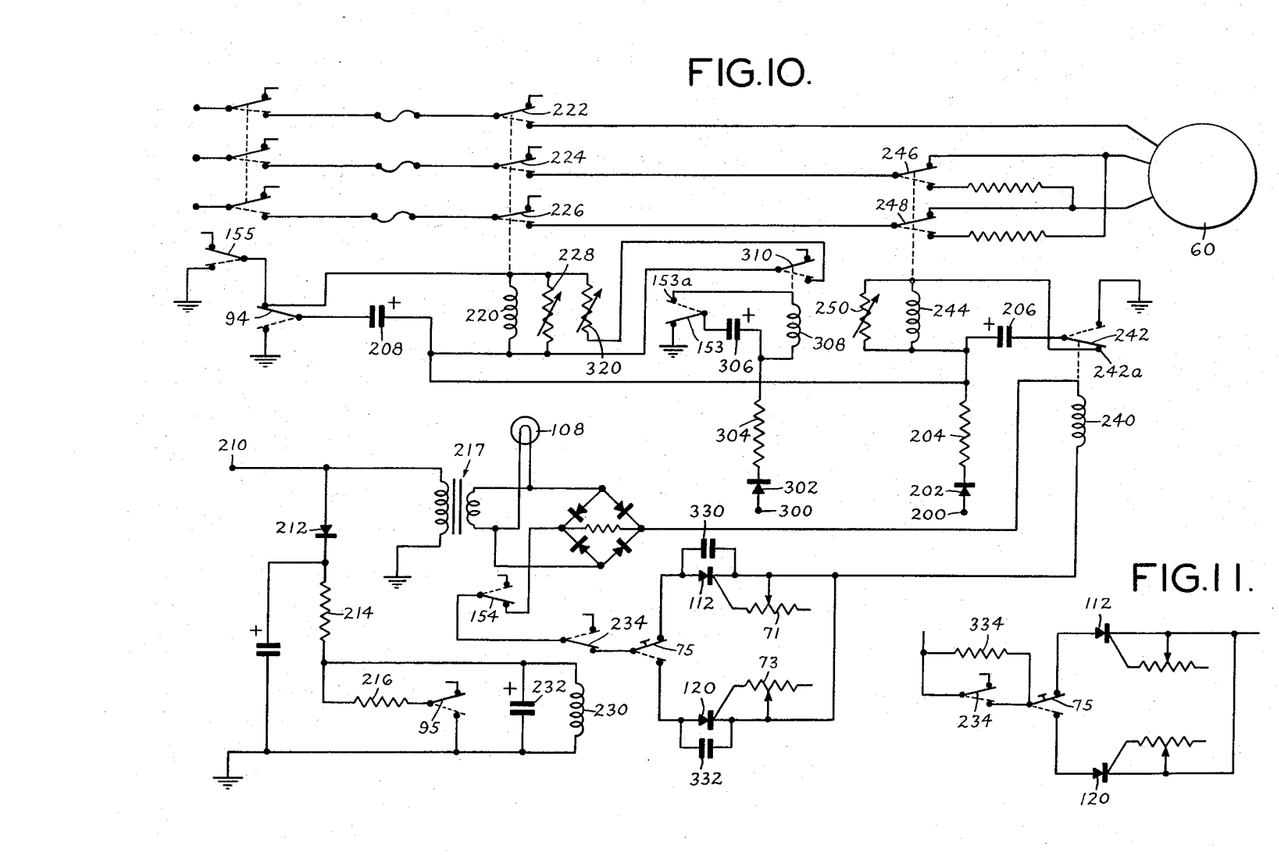
FIG. 10 is a schematic diagram of the control circuit of the instant invention similar to FIG. 9 but with the inching control added.
FIG. 11 is a schematic diagram of a part of the diagrams of FIGS. 9 and 10 showing a modification in the circuitry.

Referring to FIG. 10, in operating the machine at reduced speed with auxiliary drive motor 60 or for single stitching, main treadle 54 is released, or heeled, and auxiliary treadle 150 (FIGS. 1 and 3) is used by the operator. Thus, in FIG. 10, switches 94 and 95 are in the positions shown in FIG. 10 and remain in this position while auxiliary treadle 150 is operated.

Operation with auxiliary treadle 150 and auxiliary drive motor 60 is commenced after the machine has been stopped. Thus, relay 230 is energized and contact 234 is closed, the photoconductive switch, preselected to stop the needle in the "up" or "down" position, is still active. Relay 240 is still energized and contact 242a is closed and in the position shown in FIG. 10. Condensers 206 and 208 were discharged and, hence, relays 220 and 244 are deenergized and contacts 222, 224, 226 are all open. Contacts 246, 248 are in proper position to give a forward rotation to auxiliary motor 60.

When the operator presses auxiliary treadle 150, switch 155 is closed, or grounded, and current flows from power source 200 through rectifier 202 and is rectified to direct current. This current flows through resistor 204 charging capacitor 208 and through relay 220, closing contacts 222, 224, 226, connecting auxiliary drive motor 60 to the 3 phase, 220 volt, 60 cycle power source and auxiliary drive motor 60 drives the machine at the reduced driving speed of 1200 r.p.m.

At the same time switch 155 is closed, or grounded, switch 153 is closed, or grounded. Normally closed switch 154 is also opened. With switch 153 closed or grounded, current flows from power source 300 through rectifier 302 and is rectified to direct current. This current flows through resistor 304 and charges capacitor 306. Relay 308 remains inactive for the moment and contacts 310 remain open.

As noted above, normally closed switch 154 is opened when auxiliary treadle 150 is pressed. The opening of switch 154 de-energized relay 240 and contacts 242 are closed, or grounded, charging capacitor 206.

With auxiliary treadle 150 pressed, the machine is driven by auxiliary drive motor at approximately 1200 r.p.m.

When the operator wishes to stop the machine, he releases, or heels, auxiliary treadle 150. Switch 155 opens, and the flow of current from power source 300 to relay 220 stops. However, because condenser 208 was charged during the period when switch 155 was closed, for a short time interval after switch 155 is opened, condenser 208 discharges through relay 220. During discharge of condenser 208, contacts 222, 224, 226 are held closed by relay 220, auxiliary drive motor 60 remains connected to its power source and continues to drive. A variable resistor 320 is connected in parallel to relay 220 and, through the adjustment of variable resistor 320, the time interval of continued operation of auxiliary motor 60 is regulated.

Simultaneously with the release, or heeling, of auxiliary treadle 150 and opening of switch 155, switch 154 is closed. The activation of switch 153 to 153a position causes condenser 306 to discharge through relay 308, closing contacts 310, and connecting variable resistor 320 in parallel with relay 220 reduces the time in which power is applied to auxiliary motor 60. The closing of switch 154 reactivates the photoconductive switch so that, the next time reflector strip 130 on handwheel 12 is in proper position, relay 240 will be energized, closing contact 242a. The discharge of condenser 206 through relay 244, switches contacts 246, 248 to apply reverse polarity to auxiliary motor 60, bringing the sewing machine to a stop with the needle positioned in the preselected position.

In the embodiments shown in FIGS. 9 and 10, capacitor 330 is connected in parallel across photoconductive switch 112 and capacitor 332 in parallel across photoconductive switch 120. It has been found that, when switches 94 or 155 are closed, the voltage rate of rise is too great and prematurely triggers the photoconductive switch before the switch is intentionally triggered by reflector strip 130 on handwheel 12. Such premature triggering is prevented by these capacitors.

FIG. 11 shows a modification to the circuitry of FIGS. 9 and 10. In FIG. 11 capacitors 330, 332 are eliminated and, in their place, resistor 334 is connected across contact 234 of relay 230. This resistor, like the capacitors, prevents premature triggering of the photoconductive switches.

As has been noted, auxiliary drive motor 60 drives needle 10 at a substantially slower speed than the normal speed of drive by main drive motor 16. This slower drive might be desired when approaching the end of a seam or where a relatively short seam is required. Thus, the operator might hold auxiliary treadle 150 pressed to stitch a number of stitches at the slower needle speed.

In some sewing operations, for example, in the stitching of collars and cuffs of shirts, it may be desired to sew one stitch at a time. Such single stitch operation is readily accomplished in the instant invention. For single stitch operation, the machine operator merely momentarily presses, and releases, auxiliary treadle 150. The machine then stitches a single stitch and again stops with the needle in either the "up" or "down" position depending on the preselection of the operator. A plurality of single stitches is accomplished by the operator repeatedly pressing and releasing auxiliary treadle 150.

While the machine has been described with a main treadle 54, an auxiliary treadle 150, and control box 66 positioned under table 4, it is to be understood that other means may be substituted. For example, rather than treadles, the operation of main drive motor 16 and auxiliary drive motor 60 may be accomplished with knee operated levers or similar arrangements. Rather than positioning control box 66 under the table, this control box may be positioned in the table or at any other location convenient to the operator.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A control mechanism for electrically driven sewing machines for driving said sewing machine at preselected speeds and for stopping said sewing machine in one of a plurality of predetermined positions of the needle comprising a needle, a main driving motor for driving said needle at a first speed, an auxiliary driving motor for driving said needle at a second speed, connecting means, including clutch means, connecting said main driving motor and said auxiliary driving motor to each other and to said needle whereby, when connected, said main driving motor drives said auxiliary motor and said needle, said clutch means being selectively engageable to connect and disconnect said main driving motor with said auxiliary driving motor and said needle, means for engaging and disengaging said clutch means, means for energizing said auxiliary driving motor in a first direction when said clutch means is disengaged and for de-energizing said auxiliary driving motor when said clutch is engaged, and means on said connecting means for selectively de-energizing said auxiliary motor in said first direction and for energizing said auxiliary motor in the reverse direction to stop said needle in a predetermined position.

2. A control mechanism as recited in claim 1 in which said auxiliary motor is an induction motor.

3. A control mechanism as recited in claim 1 in which said auxiliary motor is driven by said main driving motor at a speed above its driving speed when said auxiliary motor is connected to said main driving motor.

4. A control mechanism as recited in claim 3 in which said auxiliary motor brakes said connection means when said clutch is disengaged from said main driving means and said auxiliary motor is energized in said first direction to reduce the speed of said needle.

5. A control mechanism as recited in claim 4 in which said means on said connecting means de-energizes said auxiliary motor in said first direction and energizes said auxiliary motor in the reverse direction when the speed of said auxiliary motor has been reduced to said second driving speed.

6. A control mechanism as recited in claim 5 in which said means connecting said auxiliary driving motor to the needle includes a one-way clutch drivingly connecting said auxiliary driving motor to said connecting means when said auxiliary motor is energized in said first direction and for preventing said auxiliary motor from driving said connecting means when said auxiliary motor is energized in said reverse direction.

7. A control mechanism as recited in claim 6 in which said means on said connecting means for de-energizing said auxiliary motor in said first direction and for energizing said auxiliary motor in the reverse direction includes means responsive to the position of said needle for energizing said auxiliary motor in the reverse direction to stop said needle in a preselected position.

8. A control mechanism for electrically driven sewing machines for driving said sewing machine at preselected speeds and for stopping said sewing machine in one or more predetermined positions of the needle comprising, a needle, a main driving motor for driving said needle at a first speed, an auxiliary driving motor for driving said needle at a second speed, connecting means, including clutch means, connecting said main driving motor and said auxiliary driving motor to each other and to said needle whereby, when connected, said main driving motor drives said auxiliary driving motor and said needle, said clutch means being selectively engageable to connect and disconnect said main driving motor with said auxiliary driving motor and said needle, means for engaging and disengaging said clutch means, means on said clutch engaging disengaging means for energizing said auxiliary driving motor in a first direction when said clutch means is disengaged with said main driving motor and for de-energizing said auxiliary driving motor when said clutch means is engaged with said main driving motor, means on said connecting means for de-energizing said auxiliary motor in said first direction and for energizing said auxiliary motor in the reverse direction to stop said needle in a predetermined position, and means for energizing and de-energizing said auxiliary driving motor in said first direction independent of said energizing means on said clutch engaging and disengaging means.

9. A control mechanism as recited in claim 8 in which said means on said connecting means for de-energizing said auxiliary motor in said first direction and for energizing said auxiliary motor in the reverse direction includes means responsive to the position of said needle for energizing said auxiliary motor in the reverse direction to stop said needle in a preselected position.

10. A control mechanism as recited in claim 9 in which said needle position responsive means includes light responsive means mounted in stationary position adjacent said connection means, a light source, and reflector means mounted on said connection means and rotatable therewith, said reflector means, when said light responsive means is energized, reflecting light from said light source to said light responsive means to reverse said auxiliary motor and stop said needle.

11. In a control mechanism for a sewing machine having, a needle and means for driving said needle at preselected speeds and for stopping said needle in one of a plurality of predetermined positions, a main driving motor for driving said needle at a first speed, an auxiliary driving motor for driving said needle at a second speed, connecting means, including clutch means, connecting said main motor and said auxiliary motor to each other and to said needle, said clutch means being selectively engageable for connecting and disconnecting said main driving motor with said auxiliary motor, and said needle means for energizing said auxiliary driving motor in a first direction for driving said needle when said auxiliary motor is disconnected from said main driving motor, means for de-energizing said auxiliary motor in said first direction and for re-energizing said auxiliary motor in a reverse direction to stop said needle in a predetermined position and means on said connecting means for preventing said auxiliary motor from driving said needle when said auxiliary motor is re-energized in said reverse direction.

12. In a control mechanism for driving a sewing machine at preselected speeds and for stopping the needle at one of a plurality of preselected positions, a main driving motor for driving said sewing machine at a first speed, an auxiliary motor for driving said sewing machine at a second speed, means connecting said main driving motor and said auxiliary motor to each other and to said needle whereby, when connected, said main driving motor drives said auxiliary motor and said needle, clutch means for selectively engaging and disengaging said main driving motor with said connecting means, means for energizing said auxiliary driving motor in a first direction when said clutch means is disengaged, and means for de-energizing said auxiliary motor in said first direction and for re-energizing said auxiliary motor in the reverse direction, said de-energizing and re-energizing means including sensing means for timing the re-energizing of said auxiliary motor in said reverse direction to stop said needle in a preselected position.

13. A control mechanism for driving a sewing machine at preselected speeds and for stopping said sewing machine in one of a plurality of preselected needle positions, comprising a main driving motor for driving said sewing machine at high speed, an auxiliary motor for driving said sewing machine at low speed and for braking said sewing machine to a stop, means connecting said main driving motor and said auxiliary motor to each other and to the needle whereby, when connected, said main driving motor drives said auxiliary motor and said needle, clutch means for selectively connecting and disconnecting said main driving motor to said connecting means, means for operating said clutch, means for energizing said auxiliary drive motor in a first direction when said main drive motor is disconnected from said connecting means for braking the speed of said sewing machine to the speed of said auxiliary motor, and means for de-energizing said auxiliary motor in said first direction and for re-energizing said auxiliary motor in a reverse direction for stopping said needle in a preselected position.

14. A control system for stopping an electrically driven sewing machine in one of a plurality of preselected positions of the needle comprising, a main drive motor for driving said sewing machine at a first speed, an auxiliary motor for driving said sewing machine at a second speed slower than said first speed and for stopping said sewing machine with the needle in a preselected position, means connecting said main drive motor and said auxiliary motor to each other and to said sewing machine, clutch means for engaging and disengaging said main drive motor and said connecting means for driving said sewing machine and said auxiliary motor at said first speed when said clutch is engaged, means for energizing said auxiliary motor when said clutch is disengaged for braking said sewing machine to said slower driving speed of said auxiliary motor, and means for de-energizing said auxiliary motor and for re-energizing said auxiliary motor in a reverse direction to stop said sewing machine with said needle in said preselected position.

15. A control system for stopping an electrically driven sewing machine in one of a plurality of preselected positions of the needle comprising, a main drive motor for driving said sewing machine at a first speed, an auxiliary motor for driving said sewing machine at a second speed slower than said first speed and for stopping said sewing machine with the needle in a preselected position, means connecting said main drive motor and said auxiliary motor to each other and to said sewing machine, clutch means for engaging and disengaging said main drive motor and said connecting means for driving said sewing machine and said auxiliary motor at said first speed when said clutch is engaged, means for energiing said auxiliary motor when said clutch is disengaged for braking the speed of said sewing machine to the slower driving speed of said auxiliary motor, means for de-energizing said auxiliary motor and for re-energizing said auxiliary motor in a reverse direction to stop said needle at said preselected position, and means on said auxiliary motor for preventing said auxiilary motor from driving said needle in a reverse direction.

16. In a control system as recited in claim 15 in which said means on said auxiliary motor for preventing driving in a reverse direction is a one-way clutch.

17. In a control system as recited in claim 15 in which said auxiliary motor is an induction motor.

18. In a control system as recited in claim 15 in which said auxiliary motor is a synchronous motor.

19. In a control system for stopping a rotary shaft of a sewing machine in one of a plurality of preselected angular positions, a source of electrical energy, a high speed main motor connected to said source of electrical energy for driving said motor, a low speed auxiliary motor, clutch means for engaging and disengaging said main motor with said rotary shaft and for driving said rotary shaft when said clutch means is engaged at the speed of said main motor and for driving said auxiliary motor at overspeed when said clutch means is engaged, first switch means connected with said clutch means for energizing said auxiliary motor in a forward direction when said clutch is disengaged to brake said rotary shaft to the driving speed of said auxiliary motor, a sensing means, a second switch means on said clutch means for energizing said sensing means when said clutch is disengaged, a third switch means responsive to said sensing means for de-energizing said auxiliary motor in said forward direction and for re-energizing said auxiliary motor in a reverse direction to stop said rotary shaft in a preselected position, and a one-way clutch means on said auxiliary motor for preventing said auxiliary motor for rotating said rotary shaft in the reverse direction.

References Cited
UNITED STATES PATENTS

| | | | |
|---|---|---|---|
| 2,691,751 | 10/1954 | Schaelchlin | 318—88 X |
| 3,114,340 | 12/1963 | Hedegaard | 112—219 |
| 3,149,593 | 9/1964 | Johnston | 112—219 |
| 3,170,424 | 2/1965 | Fuge | 112—219 |
| 3,186,366 | 6/1965 | Haas et al. | 112—219 |

JORDAN FRANKLIN, *Primary Examiner.*

H. H. HUNTER, *Assistant Eaxminer.*